United States Patent [19]
Rice et al.

[11] Patent Number: 6,092,604
[45] Date of Patent: Jul. 25, 2000

[54] SAND CONTROL SCREEN ASSEMBLY HAVING A SACRIFICIAL ANODE

[75] Inventors: Patrick W. Rice, Plano; Lon T. Youngberg, Coppell, both of Tex.

[73] Assignee: Halliburton Energy Services, Inc., Dallas, Tex.

[21] Appl. No.: 09/071,971

[22] Filed: May 4, 1998

[51] Int. Cl.$^7$ ................................................... E21B 43/08
[52] U.S. Cl. ........................... 166/378; 166/228; 166/231; 166/233; 166/902; 210/497.1; 210/500.1
[58] Field of Search ...................................... 166/902, 233, 166/231, 227, 228, 378, 250.05, 250.11; 210/499, 500.1, 510.1, 497.1; 29/896.61

[56] References Cited

U.S. PATENT DOCUMENTS

| | | | |
|---|---|---|---|
| 2,801,697 | 8/1957 | Rohrback | 166/244.1 |
| 4,211,625 | 7/1980 | Vandevier et al. | 204/197 |
| 5,004,049 | 4/1991 | Arterbury | 166/228 |
| 5,070,533 | 12/1991 | Bridges et al. | 392/301 |
| 5,190,102 | 3/1993 | Arterbury et al. | 166/228 |
| 5,310,000 | 5/1994 | Arterbury et al. | 166/296 |
| 5,355,956 | 10/1994 | Restarick | 166/296 |
| 5,829,522 | 11/1998 | Ross et al. | 166/228 |

OTHER PUBLICATIONS

Brochure entitled "Porous Metal Products" from Newmet Krebsöge, Inc./Thermet Krebsöge, Inc.;·KOCH Werbedrucke Remscheld.

Brochure entitled "PoroPlus!" extended –area sand–control screens from Purolator Products Company, Facet Filter Products Division, 8439 Triad Drive, Greensboro, NC 27409.

*Primary Examiner*—Hoang Dang
*Attorney, Agent, or Firm*—William M. Imwalle; Lawrence R. Youst

[57] ABSTRACT

A sand control screen assembly (10) having a sacrificial anode (26) is disclosed. The sand control screen assembly (10) comprises a plurality of ribs (16) spaced around a base pipe (12) and a screen wire (18) wrapped around the plurality of ribs (16) forming adjacent turns (20, 22) having gaps therebetween that allow the flow of fluids therethrough while preventing the flow of particulate therethrough. The plurality of ribs (16) includes at least one rib (26) that comprises a first metal. The screen wire (18) comprises a second metal that is cathodic to the first metal such that the at least one rib (26) that comprises the first metal acts as a sacrificial anode to reduce the environmental cracking of the screen wire (18).

33 Claims, 4 Drawing Sheets

SAND CONTROL SCREEN ASSEMBLY HAVING A SACRIFICIAL ANODE

TECHNICAL FIELD OF THE INVENTION

This invention relates in general, to a sand control device used in oil, gas or water wells, and in particular to, a sand control screen having a sacrificial anode that prevents stress corrosion cracking of the sand control screen.

BACKGROUND OF THE INVENTION

Since the beginning of oil production from subsurface formations, the industry has been concerned with efficient control of the movement of unconsolidated formation particles, such as sand, into the wellbore. For example, such particle movement commonly occurs during production from completions in loose sandstone or following hydraulic fracture of a formation. Production of these materials causes numerous problems in the operation of oil, gas or water wells. These problems include plugging of formations, tubing and subsurface flow lines, as well as erosion of tubing, downhole equipment and surface equipment. These problems lead to high maintenance costs and unacceptable well downtime. Accordingly, numerous methods have been utilized to control the movement of unconsolidated particles during the production of fluids.

Gravel packing is commonly used to prevent the production of sand. Generally, gravel packing involves placing pack sand, an aggregate or particulate material, in the annular space between the wellbore and a fluid permeable, perforated base pipe that is located adjacent to the production zone. A particular pack sand is selected to prevent the flow of formation particles therethrough, taking into consideration the characteristics of the particular reservoir. The perforated base pipe is designed to allow hydrocarbon liquids and gases to flow therethrough with minimum resistance. Gravel packing is commonly achieved by either an open hole gravel packing procedure or an internal gravel packing procedure, depending on the characteristics of the particular reservoir.

In addition to the use of a perforated base pipe and gravel packing, a sand control screen is commonly employed to control the movement of formation particles. These screens may comprise a continuous single screen wire that is wrapped around the base pipe. While this type of screen is capable of excluding even the smallest API grades of pack sand, these screens are easily damaged during handling, installation and production.

More recently, a sand control screen comprising a sand control screen jacket has been used. The screen jacket is fully formed from a single screen wire wrapped around a plurality of ribs that extend longitudinally along the internal surface of the screen jacket to provide strength to the screen wire and stand-off between the screen wire and the base pipe once the screen jacket is attached to the base pipe. In addition, some screen designs use prepacked sand confined around the perforated base pipe. These prepacked screens are constructed by fabricating the metal components, then forcing pack sand, either resin coated or uncoated, between the perforated base pipe and a single wire screen or between an inner wire screen and an outer wire screen of a multi-layer screen.

It has been found, however, that whether single or multi-layer, conventional or prepacked, the screen wire of sand control screens are susceptible to corrosion. Specifically, environmental cracking has occurred in the screen wire, which is the formation of brittle cracks in the screen wire material, such as a stainless steel alloy. Environmental cracking includes, for example, stress corrosion cracking. Stress corrosion cracking typically occurs as a result of contact between sand control screens made from a susceptible alloy and a halide environment which is present, for example, in saltwater or is introduced by virtue of acidizing the well.

In addition to halide ion concentration, stress corrosion cracking of materials, such as a stainless steel alloy, also depends upon the pH of the environment, the magnitude of tensile stress in the metal, time and the temperature. For example, an environment having a high halide concentration, a low pH and a high temperature promotes stress corrosion cracking of certain alloys such as the aforementioned stainless steel. This type of corrosive environment is commonly encountered by a sand control screen once it is placed downhole.

It has been found, however, that the nickel concentration in the metal alloy of the screen wire greatly affects the likelihood of stress corrosion cracking. For example, alloys having less than approximately 42% nickel, such as the most frequently used austenitic stainless steels, types 304, 304L and 316L, are susceptible to stress corrosion cracking. On the other hand, alloys having a high content of nickel, such as Incoloy 825 having approximately 42% nickel, are highly resistant to stress corrosion cracking. As such, materials such as Incoloy 825 have been used for the screen wire of sand control screens to overcome the problem of environmental cracking. The cost of exotic materials such as Incoloy 825, however, is between three and eight times that of stainless steels.

Therefore, a need has arisen for a sand control screen for filtering particles out of fluid produced from a wellbore that is capable of withstanding the severe downhole conditions encountered during installation, production, acidizing and the like. A need has also arisen for such a sand control screen that will not suffer from environmental cracking in an environment having a high halide concentration, a low pH and a high temperature. Additionally, a need has arisen for such a sand control screen that does not require the use of exotic alloys such as Incoloy 825 but instead utilizes less expensive materials for the screen.

SUMMARY OF THE INVENTION

The present invention disclosed herein is a sand control screen assembly for filtering particles out of fluid produced from a wellbore that is capable of withstanding severe downhole conditions during installation, production, acidizing and the like. The sand control screen assembly of the present invention is resistant to environmental cracking in halide, low pH and high temperature environments and does not require the use of exotic alloys such as Incoloy 825 but instead utilizes dissimilar metals within the screen assembly to control corrosion.

The sand control screen assembly comprises a plurality of ribs that are spaced around and run parallel to the long axis of a base pipe. At least one of the ribs comprises a first metal. The sand control screen assembly also comprises a screen wire that is wrapped around the ribs. The screen wire forms a plurality of adjacent turns around the ribs. The turns have gaps therebetween to allow fluid flow therethrough. The screen wire comprises a second metal that is cathodic to the first metal. Due to the galvanic action between the first metal and the second metal, the at least one rib comprising the first metal acts as a sacrificial anode for the screen wire. The galvanic action between the first metal and the second metal requires that the at least one rib comprising the first metal contacts the screen wire of the second metal. As such, each turn of the screen wire may be in electrical contact with the at least one rib comprising the first metal.

In one embodiment of the present invention, the first metal of the at least one rib may be a steel, such as a carbon steel or a low alloy steel. The second metal that is used for the screen wire may be a stainless steel such as an austenitic stainless steel, for example, 316L stainless steel. In this embodiment, the steel will be anodic to the stainless steel, thereby cathodically protecting the stainless steel screen wire.

In one embodiment of the present invention, the material used for each of the ribs of the sand control screen may be the first metal. Alternatively, the material of any number between one and all of the ribs may be the first metal. If the material of all of the ribs is not the first metal, the material of the remainder of the ribs may be the second metal, i.e., the same material as the screen wire.

In the method of the present invention, the environmental cracking of the sand control screen of a sand control screen assembly is mitigated by electrically contacting the sand control screen with a sacrificial anode. In one embodiment, at least one rib of a plurality of ribs is constructed from a first metal. A screen wire is then electrically contacted with the at least one rib by forming a plurality of adjacent turns with gaps therebetween about the ribs. The screen wire is constructed from a second metal that is cathodic to the first metal. The utilization of the two dissimilar metals reduces the likelihood of environmental cracking of the screen wire by sacrificing the metal of the at least one rib comprising the first metal.

BRIEF DESCRIPTION OF THE DRAWINGS

For a more complete understanding of the present invention, including its features and advantages, reference is now made to the detailed description of the invention, taken in conjunction with the accompanying drawings in which like numerals identify like parts and in which.

DETAILED DESCRIPTION OF THE INVENTION

While the making and using of various embodiments of the present invention is discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
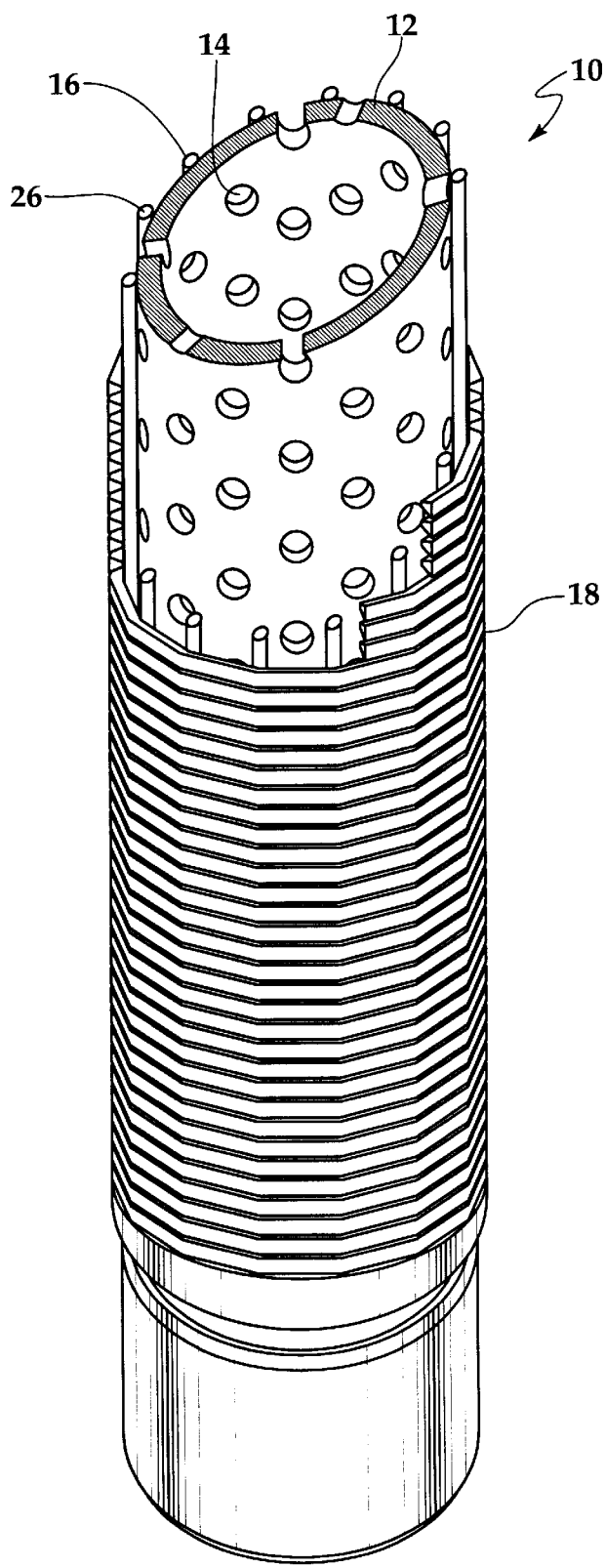
FIG. 1 is a partial cutaway view showing a sand control screen of the present invention.
Figure 2:
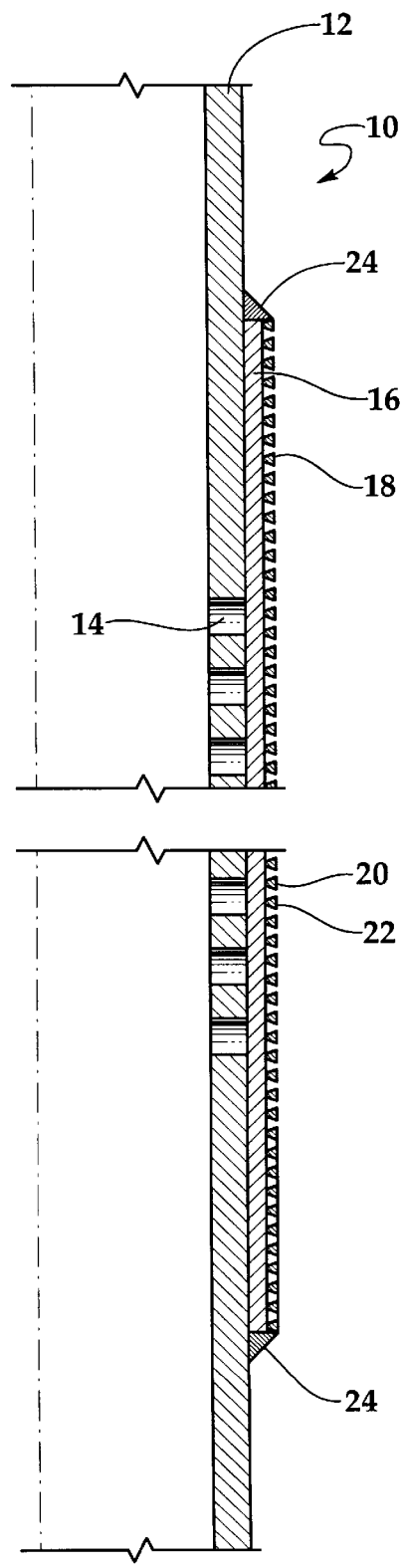
FIG. 2 is a cross sectional view of a sand control screen of the present invention of the type shown in FIG. 1.

Referring to FIGS. 1 and 2, one embodiment of a sand control screen assembly is depicted and generally designated 10. Sand control screen assembly 10 includes a base pipe 12 that has a plurality of perforations 14 which allow the flow of production fluids into the production tubing (not pictured) that is attached to base pipe 12 and extends to the well head. Spaced around base pipe 12 is a plurality of ribs 16. Ribs 16 are generally symmetrically distributed about the axis of base pipe 12.

Even though ribs 16 are depicted as cylindrical, it should be understood by one skilled in the art that ribs 16 may alternatively have a rectangular or triangular cross section or other suitable geometry. Additionally, even though sixteen ribs 16 are depicted in FIG. 1, it should be understood by one skilled in the art that the number of ribs will be dependent upon the diameter of base pipe 12 as well as other design characteristics that are well known in the art.

Wrapped around ribs 16 is a screen wire 18. Screen wire 18 forms a plurality of turns, such as turn 20 and turn 22 having gaps therebetween. The gaps provide a path for fluid flow, both liquid and gas, but exclude sands and particulate from flowing into base pipe 12. The number of turns and the gap between the turns are determined based upon the characteristics of the formation from which fluid is being produced and is well known to those skilled in the art. Sand control screen 10 may be attached to base pipe 12 using welds 24 or by suitable mechanical methods.

In corrosive environments, it has been necessary that the material used in screen wire 18 comprise a high nickel alloy such as Incoloy 825 to retard environmental cracking such as stress corrosion cracking that may occur in halide environments. In the present invention, environmental cracking is effectively neutralized by cathodically polarizing screen wire 18 by galvanic corrosion of one or more of ribs 16, such as rib 26 which serves a sacrificial anode. This type of corrosion occurs when two metals of different compositions electrically contact one another in a common electrolyte. The process is similar to a DC cell in which the more active or anodic metal becomes the anode and corrodes while the less active or cathodic metal becomes a cathode and is protected. This cathodic protection is an electrochemical method of corrosion control in which the oxidation reaction in a galvanic cell is concentrated at the anode and suppresses corrosion of the cathode in the same cell. The electrical potential between the anode and cathode causes the corrosion current to flow. The anode suffers metal loss and corrosion in an amount that is directly proportional to the amount of current flow. Thus, the magnitude of potential difference between the two metals and which of the metals has the more negative potential will determine which metal is the cathode and which is the anode as well as the rate of corrosion that will occur at the anode. The anode in such a galvanic cell is typically referred to as a sacrificial or galvanic anode.

The relative tendencies of metals to corrode remains about the same in many environments in which they are likely to be used. Consequently, their relative positions in a galvanic series can be about the same in many environments. Since more measurements of galvanic potentials have been made in seawater than in any other environment, the arrangement of metals in a galvanic series based on such observations is frequently used as a first approximation of the probable direction of the galvanic effect in other environments in the absence of data more directly applicable to such environments. Table 1 shows a series of metals and alloys that are arranged in order of decreasing negative electrode potential, increasing corrosion resistance, in seawater and potentials with respect to the standard hydrogen electrode (SHE).

TABLE 1

Galvanic Series in Seawater

| | Metal or Alloy | Potential vs. SHE |
|---|---|---|
| Active (anodic) | Magnesium | -1.49 |
| | Zinc | -0.81 |
| | Cadmium | -0.64 |
| | Aluminum | -0.61 |
| | Steel (carbon or low alloy) | -0.38 |
| | Type 300 Series SS (active) | -0.36 |
| | Lead | -0.32 |
| | Tin | -0.27 |
| | Admiralty Metal | -0.12 |
| | Hydrogen (SHE) | 0.00 |
| | Copper | +0.02 |
| | Nickel | +0.10 |
| | Monel | +0.13 |
| | Titanium | +0.14 |
| | Type 300 Series SS (passive) | +0.15 |
| | Silver | +0.16 |
| | Graphite | +0.49 |
| Noble (cathodic) | Platinum | +0.50 |
| | Gold | +0.50 |

The driving voltage of a galvanic couple is the difference between the open circuit potential of the members. For example, there is approximately 0.5 volts potential between steel and type 300 series stainless steel (passive) in seawater. Passive indicates that the type 300 series stainless steel is protected by a thin, normally present, oxide layer. Based upon the galvanic series in seawater as shown in Table 1, selecting a metal that is more cathodic for screen wire 18 than the metal selected for one or more of the ribs 16, such as rib 26, results in rib 26 becoming a sacrificial anode for screen wire 18, thereby effectively neutralizing stress corrosion cracking of screen wire 18, which does not occur in the presence of cathodic polarization.

It should be noted that the number of ribs 26 that are a dissimilar metal from screen wire 18 may range from a single rib 26 or all ribs 16 depending upon the potential and current flow between the two metals and the environment of the intended service of sand control screen 10 characterized by, among other things, the temperature, the partial pressure of hydrogen sulfide, the partial pressure of carbon dioxide, the halide concentration and the acidity of the environment. In addition, the number, size and shape of ribs 26 may also be varied depending upon the above-mentioned potential difference and environmental factors.

As an example, sand control screen 10 may use steel as the material for one or more ribs 26 and use 316L stainless steel as the material for screen wire 18. In this configuration, screen wire 18 is a cathode that is electrically connected to one or more ribs 26 that serve as sacrificial anodes. Ribs 26 will therefore cathodically polarize and thereby protect screen wire 18 against stress corrosion cracking in an environment that would otherwise cause cracking of screen wire 18.

Figure 3:
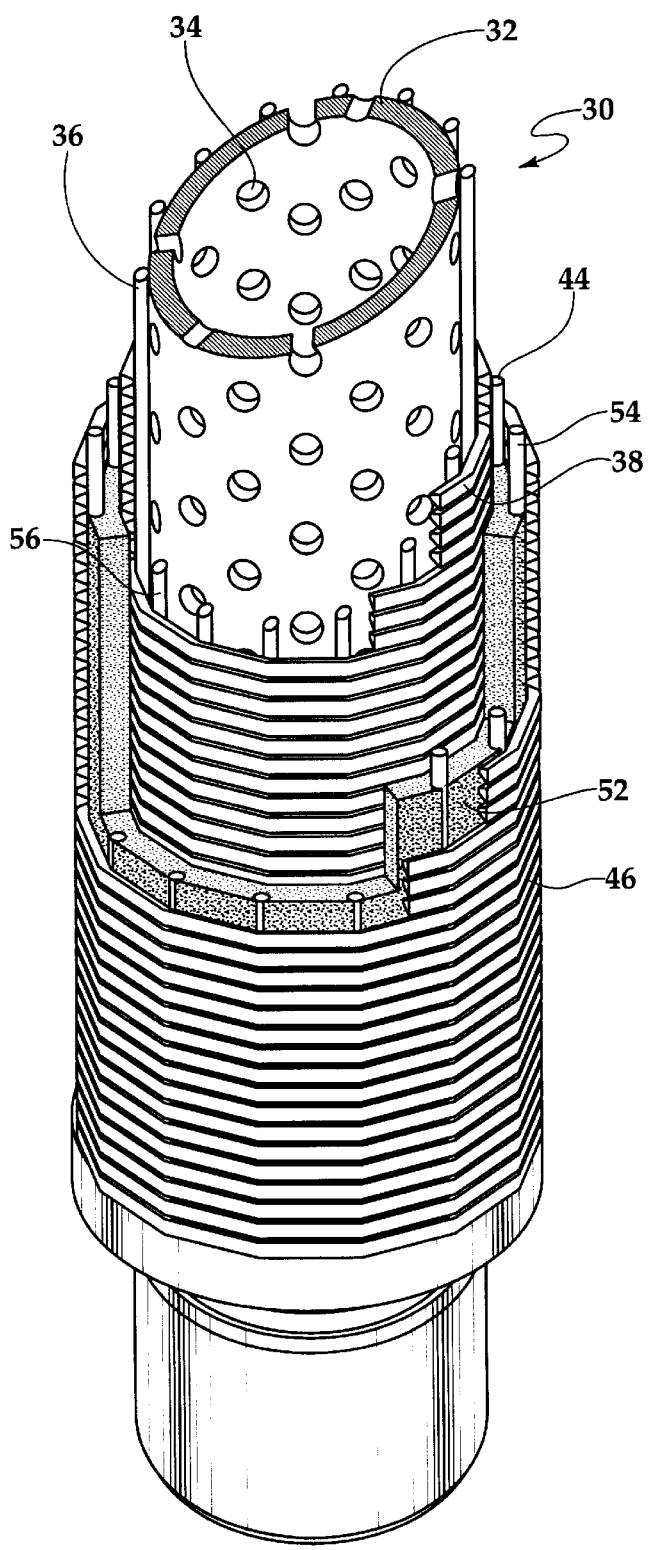
FIG. 3 is a partial cutaway view showing sand control screen of the present invention.
Figure 4:
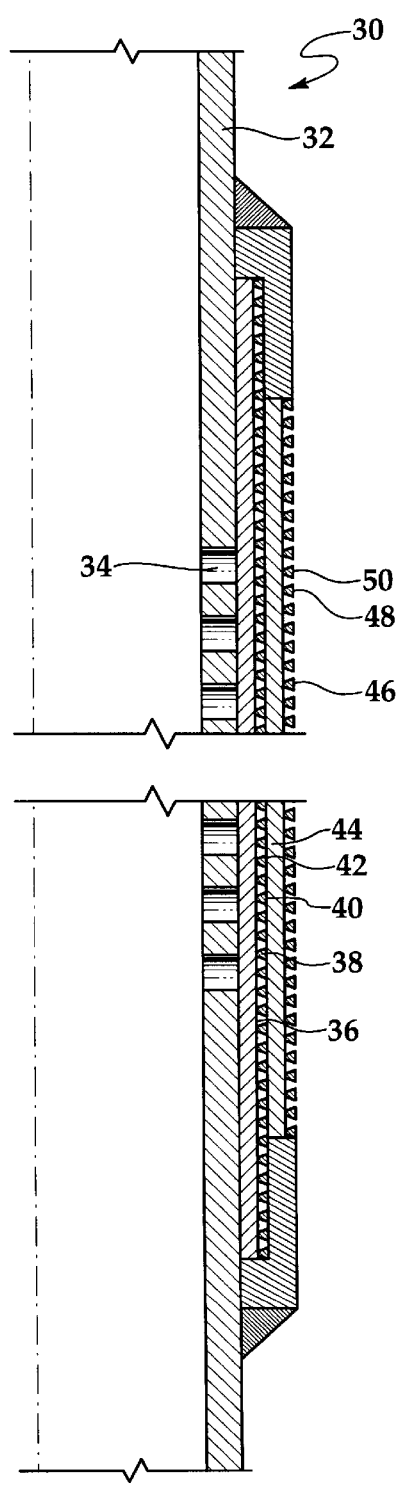
FIG. 4 is a cross sectional view of a sand control screen of the present invention of the type shown in FIG. 2.

Referring now to FIGS. 3 and 4, another embodiment of a sand control screen assembly is depicted and generally designated 30. Sand control screen assembly 30 includes a base pipe 32 having a plurality of perforations 34. Sand control screen assembly 30 also includes a plurality of ribs 36 that are symmetrically positioned about the axis of base pipe 32. A screen wire 38 is wrapped around ribs 36 forming adjacent turns such as turn 40, 42 having gaps therebetween. Symmetrically positioned about screen wire 38 is a plurality of ribs 44. Wrapped around ribs 44 is a screen wire 46 that forms a plurality of turns such as turns 48, 50 having gaps therebetween. Disposed in the annular area between screen wire 38 and screen wire 46 is a prepack sand 52. Prepack sand 52 may be resin coated and baked in place.

In this embodiment, both screen wire 38 and screen wire 46 are susceptible to stress corrosion cracking. As such, the material selected for one or more of the ribs 44, such as rib 54, is anodic to the material selected for screen wire 46. Likewise, the material selected for one or more of the ribs 36, such as rib 56, is anodic to the material selected for screen wire 38. In both cases, the ribs 54, 56 respectively serve as sacrificial anodes for screen wires 46, 38.

Figure 5:
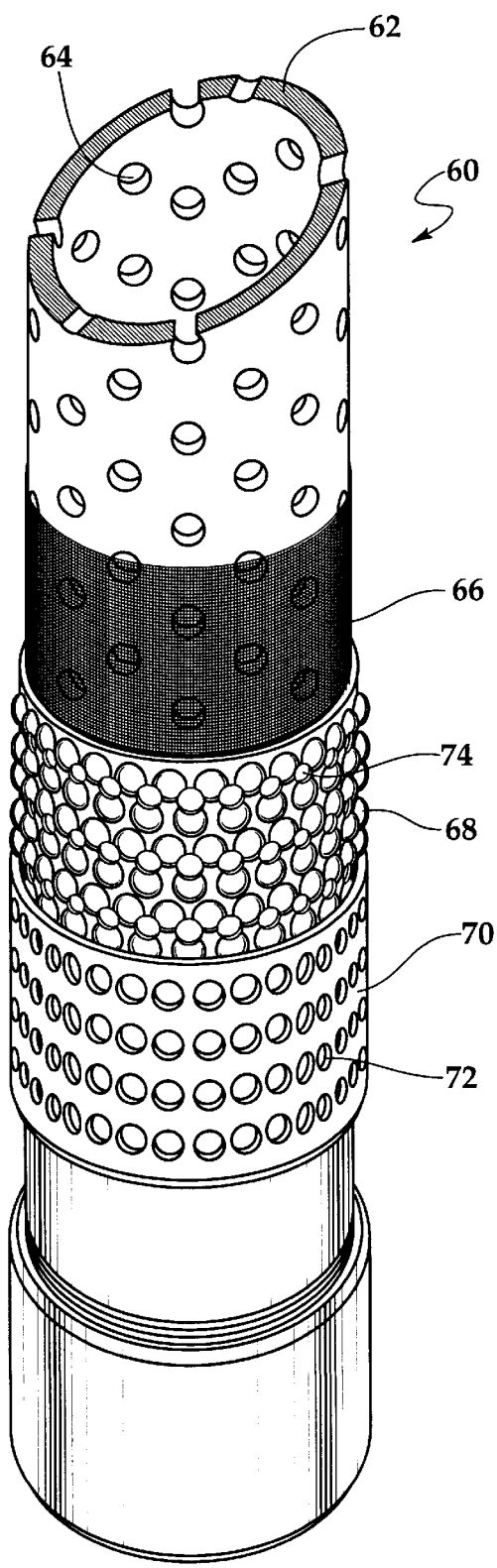
FIG. 5 is a partial cutaway view showing sand control screen of the present invention.

Referring now to FIG. 5, another embodiment of a sand control screen assembly is depicted and generally designated 60. Sand control screen assembly 60 includes a base pipe 62 that has a plurality of perforations 64 that allow for fluid production therethrough. Positioned about base pipe 62 is a sand control screen 66. Sand control screen 66 consists of a series of wire screen meshes. For example, sand control 66 may comprise five wire screen meshes, however, it is contemplated that the actual number of wire screen meshes utilized may vary from well to well. The mesh size used in sand control screen 66 will also vary from well to well depending upon the fluids to be produced, the rate of production, the geometry of the bore hole, the type of pipe string and the nature of the particles present in the formation. In general, the mesh size will range from about 10 to 250 U.S. Standard Mesh, however, any desired mesh sizes may be used.

The sequence of the wire screen meshes of sand control screen 66 may be selected depending upon the aforementioned factors. For example, the wire screen meshes may be sequenced such that larger particles carried by the production fluids are removed by the outermost wire screen mesh while smaller particles are removed by subsequent wire screen meshes. Typically, the innermost wire screen mesh may have a relatively larger mesh size and be constructed from relatively larger wire mesh to protect the other wire screen meshes of sand control screen 66 that may have a smaller mesh size and wire diameter during the installation of sand control screen 66 over base pipe 62.

Disposed about sand control screen 66 is a shroud 68. Disposed about shroud 68 is a housing 70. Housing 70 protects both shroud 68 and sand control screen 66 during installation. During production, fluids from the formation pass through perforation 72 of housing 70 carrying sands and other particulate at a high rate of speed. Shroud 68 is positioned between sand control screen 66 and housing 70 creating a torturous path for fluid flow, thereby reducing the speed of the flow of production fluids along with the sands and other particulate. Thereafter, the fluid, along with the sands and other particulate, flow through perforations 74 of shroud 68 at a reduced speed thereby preventing damage to the wire screen meshes of sand control screen 66.

In the past, due to the corrosive downhole environment, it has been necessary that the wire screen meshes of sand control screen 66 be made from exotic alloys such as Incoloy 825 or Alloy 20Cb-3 or coated with chemicals such as corrosion inhibitors. In the present invention, environmental cracking is effectively neutralized by cathodic protection of the wire screen meshes of sand control screen 66. For example, one or more of the wire screen meshes or even a single element of a wire screen mesh may be constructed from a metal that is cathodic to the metal used to construct the remainder of the wire screen meshes. Preferably, the innermost wire screen mesh may be constructed from steel while the remainder of the wire screen meshes are constructed from 316L stainless steel.

Alternatively, sand control screen 66 may be cathodically protected by electrically contacting sand control screen 66 with shroud 68. In this case, shroud 68 is constructed from a metal that is anodic to the metal used to construct sand control screen 66. For example, shroud 68 may be constructed from steel while sand control screen 66 may be constructed from 316L stainless steel.

While sand control screen assembly 60 has been described with sand control screen 66 placed between base pipe 62 and shroud 68 and perforated housing 70, sand control screen assembly 60 may also be provided in an embodiment in which shroud 68 and perforated housing 70 are not utilized. In such a case, sand control screen 66 may be secured to base pipe 62 using mechanical methods, spot welding or the like.

Figure 6:
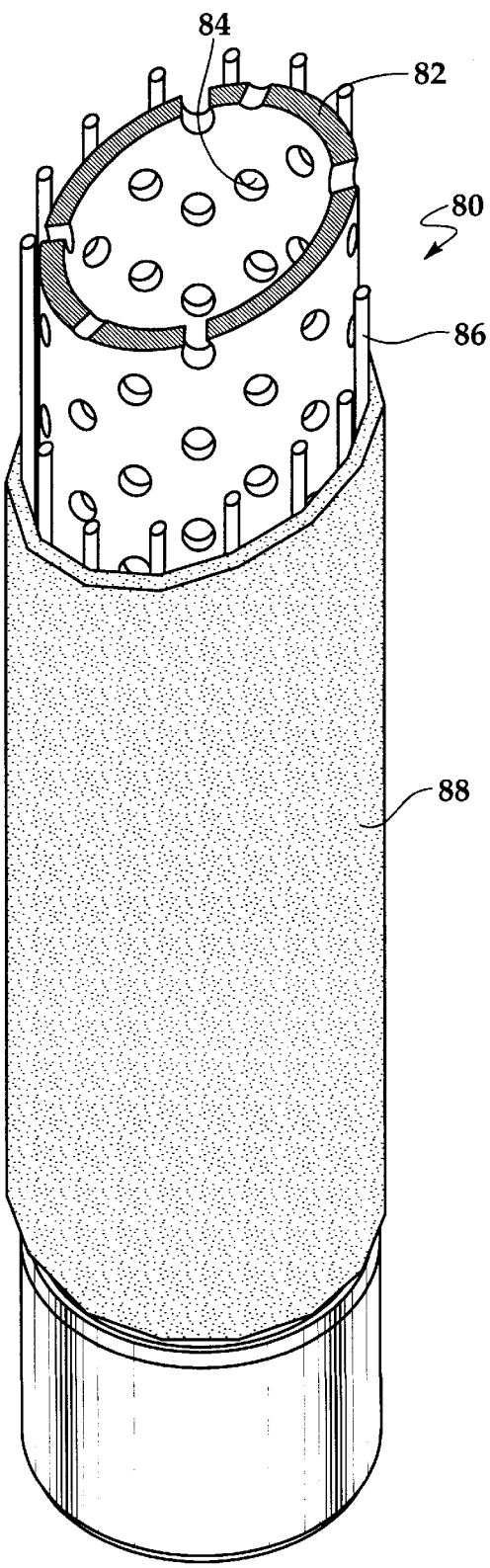
FIG. 6 is a partial cutaway view showing sand control screen of the present invention.

Referring now to FIG. 6, a sand control screen assembly 80 is depicted. Sand control screen assembly 80 includes a base pipe 82 having a plurality of perforations 84. Sand control screen assembly 80 also includes a plurality of ribs 86 that are symmetrically positioned about the axis of base pipe 82. Disposed about ribs 86 is a sand control screen 88. Sand control screen 88 is constructed from a porous sintered metal structure. The porous sintered metal structure is formed using metal powder particles that are metallurgically bonded at their contact points by a sintering operation. The space between the particles provide a continuous network of well defined pores whose size and distribution are dependent upon the particles and the processing methods. The size and distribution of the pores is selected based upon factors such as the fluid to be produced, the rate of production, the geometry of the bore hole, the type of pipe string and the nature of the particles present in the formation.

It has been found, however, that sand control screen 88 is susceptible to stress corrosion cracking. As such, the material selected for ribs 86 is anodic to the material selected for sand control screen 88 such that ribs 86 will serve as a sacrificial anode for sand control screen 88. Even though FIG. 6 has depicted a plurality of spaced apart ribs 86 as the sacrificial anode for sand control screen 88, it should be understood by one skilled in the art that alternate configurations may be suitable for the sacrificial anode such as a single wire wrapped around base pipe 82 having turns that extend through the length of sand control screen 88 or having a plurality of ribs wrapped circumferentially around base pipe 82 also extending through the length of sand control screen 88.

Figure 7:
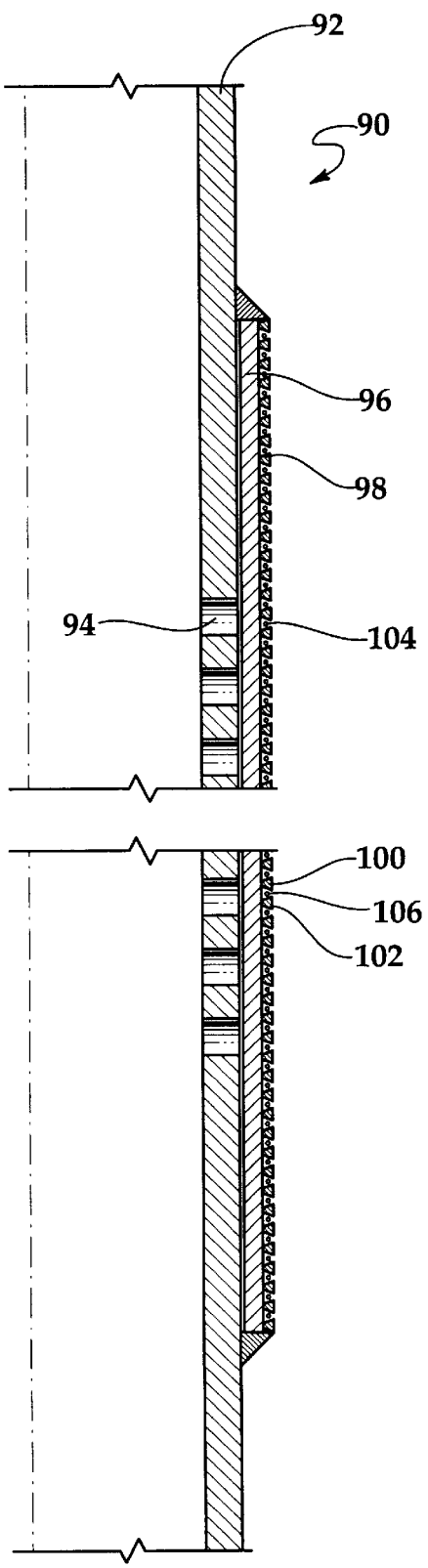
FIG. 7 is a cross sectional view of a sand control screen of the present invention.

Referring now to FIG. 7, a cross sectional view of a sand control screen assembly is depicted and generally designated 90. Sand control screen assembly 90 includes a base pipe 92 that has a plurality of perforations 94. Spaced around base pipe 92 is a plurality of ribs 96. Ribs 96 are generally symmetrically distributed about the axis of base pipe 92. Wrapped around ribs 96 is a screen wire 98 that forms a plurality of turns, such as turn 100 and turn 102 having gaps therebetween. Also wrapped around ribs 96 is a wire 104 that forms a plurality of turns, such as turn 106. Each of the turns of wire 104 is disposed between two adjacent turns of screen wire 98. For example, turn 106 of wire 104 is disposed between turn 100 and turn 102 of screen wire 98. In this embodiment, wire 104 may serve as the sacrificial anode for screen wire 98. For example, wire 104 may be steel while screen wire 98 may be 316L stainless steel. In this example, the metal used for ribs 96 may either be steel or 316L stainless steel depending upon the expected rate of corrosion.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A sand control screen comprising:

a plurality of ribs spaced around an axis, at least one of the plurality of ribs comprising a first metal; and a screen wire wrapped around the plurality of ribs forming adjacent turns having gaps therebetween, the screen wire comprising a second metal that is cathodic to the first metal whereby the at least one of the plurality of ribs comprising a first metal is a sacrificial anode for the screen wire.

2. The sand control screen as recited in claim 1 wherein each turn of the screen wire is in electrical contact with the at least one of the plurality of ribs comprising a first metal.

3. The sand control screen as recited in claim 1 wherein the first metal further comprises steel.

4. The sand control screen as recited in claim 1 wherein the second metal further comprises stainless steel.

5. The sand control screen as recited in claim 4 wherein the stainless steel is austenitic stainless steel.

6. The sand control screen as recited in claim 4 wherein the stainless steel is 316L stainless steel.

7. The sand control screen as recited in claim 1 wherein each of the plurality of ribs further comprises the first metal.

8. The sand control screen as recited in claim 1 wherein at least one of the plurality of ribs further comprises the second metal.

9. A sand control screen for disposition about a perforated base pipe that is threadably attachable to a pipe string, the sand control screen comprising:

a plurality of ribs spaced around an axis, at least one of the plurality of ribs comprising a first metal; and a screen wire wrapped around the plurality of ribs forming adjacent turns having gaps therebetween, the screen wire comprising a second metal that is cathodic to the first metal, each of the turn of the screen wire being in electrical contact with the at least one of the plurality of ribs comprising a first metal such that the at least one of the plurality of ribs comprising a first metal acts as a sacrificial anode to retard the environmental cracking of the screen wire.

10. The sand control screen as recited in claim 9 wherein the first metal further comprises steel.

11. The sand control screen as recited in claim 9 wherein the second metal further comprises stainless steel.

12. The sand control screen as recited in claim 11 wherein the stainless steel is austenitic stainless steel.

13. The sand control screen as recited in claim 11 wherein the stainless steel is 316L stainless steel.

14. The sand control screen as recited in claim 9 wherein each of the plurality of ribs further comprises the first metal.

15. The sand control screen as recited in claim 9 wherein at least one of the plurality of ribs further comprises the second metal.

16. A method for retarding the environmental cracking of a screen wire of a sand control screen comprising the steps of:

providing a plurality of ribs;

including at least one rib comprising a first metal;

wrapping the screen wire around the plurality of ribs forming adjacent turns having gaps therebetween, the screen wire comprising a second metal that is cathodic to the first metal; and retarding the environmental cracking of the screen wire by utilizing the at least one rib comprising a first metal as a sacrificial anode.

17. The method as recited in claim 16 further comprising the step of electrically coupling each of the turn of the screen wire with the at least one rib comprising a first metal.

18. The method as recited in claim 16 wherein the first metal further comprises steel and the second metal further comprises stainless steel.

19. The method as recited in claim 16 wherein each of the plurality of ribs further comprises the first metal.

20. The method as recited in claim 16 further comprising the step of including at least one rib comprising the second metal.

21. A sand control screen assembly comprising:

a base pipe;

a sand control screen disposed about the base pipe, the sand control screen comprising a first metal; and a sacrificial anode electrically contacting the sand control screen, the sacrificial anode comprising a second metal that is anodic to the first metal to retard environmental cracking of the sand control screen.

22. The sand control screen assembly as recited in claim 21 wherein the sand control screen further comprises a plurality of ribs spaced around the base pipe.

23. The sand control screen assembly as recited in claim 22 wherein the sacrificial anode further comprises at least one of the ribs.

24. The sand control screen assembly as recited in claim 22 wherein the sacrificial anode further comprises each of the ribs.

25. The sand control screen assembly as recited in claim 22 wherein the sand control screen further comprises a screen wire wrapped around the plurality of ribs forming adjacent turns having gaps therebetween.

26. The sand control screen assembly as recited in claim 25 wherein the sacrificial anode further comprises a wire wrapped around the plurality of ribs disposed between adjacent turns of the screen wire.

27. The sand control screen assembly as recited in claim 21 wherein sand control screen further comprises a series of wire screen meshes.

28. The sand control screen assembly as recited in claim 27 wherein the series of wire screen meshes are sintered.

29. The sand control screen assembly as recited in claim 27 wherein the sacrificial anode is one of the wire screen mesh in the series of wire screen meshes.

30. The sand control screen assembly as recited in claim 27 wherein the sacrificial anode is the innermost wire screen mesh of the series of wire screen meshes.

31. The sand control screen assembly as recited in claim 27 further comprising a shroud disposed about the series of wire screen meshes and a perforated housing disposed about the shroud.

32. The sand control screen assembly as recited in claim 31 wherein the sacrificial anode is the shroud.

33. The sand control screen assembly as recited in claim 21 wherein sand control screen further comprises a porous sintered metal structure.

* * * * *